US012394403B2

(12) United States Patent
Tachi et al.

(10) Patent No.: US 12,394,403 B2
(45) Date of Patent: Aug. 19, 2025

(54) ACTIVE NOISE CONTROL SYSTEM

(71) Applicant: Alps Alpine Co., LTD., Tokyo (JP)

(72) Inventors: Ryosuke Tachi, Fukushima (JP); Keita Tanno, Fukushima (JP)

(73) Assignee: Alps Alpine Co., LTD., Tokyo (JP)

( * ) Notice: Subject to any disclaimer, the term of this patent is extended or adjusted under 35 U.S.C. 154(b) by 214 days.

(21) Appl. No.: 18/196,008

(22) Filed: May 11, 2023

(65) Prior Publication Data

US 2023/0410783 A1 Dec. 21, 2023

(30) Foreign Application Priority Data

May 18, 2022 (JP) ................................ 2022-081550

(51) Int. Cl.
*G10K 11/178* (2006.01)

(52) U.S. Cl.
CPC .. *G10K 11/17825* (2018.01); *G10K 11/17823* (2018.01); *G10K 11/17881* (2018.01); *G10K 2210/1282* (2013.01); *G10K 2210/3026* (2013.01); *G10K 2210/3027* (2013.01); *G10K 2210/3028* (2013.01); *G10K 2210/3044* (2013.01); *G10K 2210/3046* (2013.01); *G10K 2210/3055* (2013.01); *G10K 2210/3056* (2013.01); *G10K 2210/3221* (2013.01)

(58) Field of Classification Search
CPC ............... G10K 2210/3056; G10K 2210/3044
See application file for complete search history.

(56) References Cited

U.S. PATENT DOCUMENTS

2014/0226831 A1 8/2014 Tzirkel-Hancock et al.

FOREIGN PATENT DOCUMENTS

| | | | |
|---|---|---|---|
| EP | 2 239 728 | A2 | 10/2010 |
| JP | 2010-163054 | | 7/2010 |
| WO | WO 2021/234897 | A1 | 11/2021 |
| WO | WO 2022/020847 | A1 | 1/2022 |

OTHER PUBLICATIONS

European Search Report, dated Sep. 27, 2023, pp. 1-44, issued in Application No. 23169870.5, European Patent Office, Munich, Germany.

*Primary Examiner* — Ping Lee
(74) *Attorney, Agent, or Firm* — Crowell & Moring LLP

(57) ABSTRACT

An active noise control system includes an error adder that generates an error signal by adding an output of a left-seat left microphone and an output of a left-seat right microphone, an adaptive filter that generates a noise canceling sound from a reference signal by performing an adaptive operation using the reference signal and the error signal, a left channel gain adjustment section that adjusts a gain of the noise canceling sound to be output to a left-seat left speaker, and a right channel gain adjustment section that adjusts a gain of the noise canceling sound to be output to the left-seat right speaker. A ratio between the gains of the left channel gain adjustment section and the right channel gain adjustment section matches a ratio between loudness levels of noise transmitted to the output of the left-seat left microphone and the output of the left-seat right microphone.

8 Claims, 5 Drawing Sheets

ACTIVE NOISE CONTROL SYSTEM

RELATED APPLICATION

The present application claims priority to Japanese Patent Application Number 2022-081550, filed May 18, 2022, the entirety of which is hereby incorporated by reference.

BACKGROUND

1. Field of the Disclosure

The present disclosure relates to a technique of active noise control (ANC) which reduces noise by emitting a noise canceling sound that cancels noise.

2. Description of the Related Art

As an active noise control technique, as illustrated in FIG. 5, an active noise control system in which sound, such as music, output from a sound source apparatus 51 for a user in a first area to a speaker 52 for the user in the first area is determined as noise for a user in a second area. A noise canceling sound that is generated by an adaptive filter 53 is emitted from a speaker 54 in the second area, as disclosed in JP 2010-163054 A.

In such an active noise control system, the adaptive filter 53 determines an output of an error microphone 55 located in the second area as an error and determines an output of an estimation filter 56 having a transfer function $\hat{C}(z)$ set therein estimated as a transfer function C(z) from a speaker 54 to the error microphone 55 in the second area as a filtered reference signal. A coefficient update section 532 updates a tap coefficient of a variable filter 531 that generates a noise canceling sound using the output of the sound source apparatus 51 based on a Filtered-X LMS algorithm for performing LMS algorithm so that an error is minimized.

Consider a case where the active noise control system shown in FIG. 5 is applied to a system in which users in individual seats in a car listen to music using left and right speakers provided respectively for the seats and the music being listened to by the other users is cancelled as noise for the individual users.

In this case, it is preferable, for left and right ears of one of the users, that left and right error microphones located in positions of the left and right ears of the user and adaptive filters corresponding to a combination of left and right speakers of a seat of the user are provided so that music listened to by the other user can be canceled and noise canceling sounds generated by the adaptive filters corresponding to the left and right speakers are output from the left and right speakers so that noise canceling is performed for the positions of the left and right ears of the user.

However, this may increase the number of adaptive filters, resulting in an excessive scale and an excessive processing load.

Therefore, the number of adaptive filters may be reduced by combining sounds output from the left and right error microphones into a monaural sound, and sharing a noise canceling sound generated by one adaptive filter using this monaural sound as an output of a single error microphone as the noise canceling sound to be output from the eft and right speakers. However, since the same noise canceling sound is output from the left and right speakers in this way, when there is a relatively large difference in a transfer function, such as a gain or a delay time from the other user's speaker, which is a noise source, to the left and right error microphones (left and right ears of the user), the noise output from the other user's speaker may not be appropriately canceled.

SUMMARY

To address the above problem, the present disclosure provides an active noise control system having a plurality of error microphones with a less complex configuration that sufficiently cancels noise even when there is a relatively large difference between transfer functions from a noise source to the individual error microphones.

Accordingly, it is an objective of the present disclosure to provide an active noise control system, that reduces noise. In one form an active noise control system includes a first microphone that is disposed in a position displaced in a first direction relative to a user, a second microphone that is disposed in a position displaced in a second direction relative to the user, a first speaker configured to emit sound toward an area around the position where the first microphone is disposed, a second speaker configured to emit sound toward an area around the position where the second microphone is disposed, an error signal generator configured to generate an addition signal by adding an output of the first microphone and an output of the second microphone, an adaptive filter configured to perform an adaptive operation of minimizing an error using a signal correlated with the noise as a reference signal and the addition signal as the error so as to generate a noise canceling sound to be output to the first and second speakers, and a gain adjustment section configured to adjust a ratio between a loudness level of a first noise canceling sound which is the noise canceling sound to be output to the first speaker and a loudness level of a second noise canceling sound which is the noise canceling sound to be output to the second speaker. Here, the gain adjustment section performs the adjustment so that the ratio of the loudness level of the second noise canceling sound to the loudness level of the first noise canceling sound matches a ratio of a loudness level of noise transmitted from a noise source of the noise to the second microphone to a loudness level of noise transmitted from a noise source of the noise to the first microphone.

The active noise control system may include, instead of the gain adjustment section or in addition to the gain adjustment section, a delay adjustment section configured to adjust a delay time between a first noise canceling sound which is the noise canceling sound output to the first speaker and a second noise canceling sound which is the noise canceling sound output to the second speaker. The delay adjustment section may perform the adjustment so that a delay time of the second noise canceling sound relative to the first noise canceling sound matches a delay time of noise transmitted from a noise source of noise to the second microphone relative to the noise transmitted from the noise source of the noise to the first microphone.

In the active noise control system, when one of a position near a left ear of the user or a position near a right ear of the user is determined as a first position and the other is determined as a second position, the first microphone may be disposed in the first position and the second microphone may be disposed in the second position.

In this case, when one of the left or right seats of the car is the first seat and the other is the second seat, the user may be the user seated in the first seat, and the noise may be sound output from a loudspeaker near the second seat to an occupant of the second seat.

According to implementations of active noise control systems described in the present disclosure, since the relationship between a gain and a delay time that matches the relationship between a gain and a delay time of noise from the noise source to the first microphone and the second microphone may be assigned between noise canceling sounds output from the first speaker that emits sound toward the position where the first microphone is disposed and the second speaker that emits sound toward the position where the second microphone is disposed, even when a gain of the noise or a difference between delay times is comparatively large, the noise may be appropriately canceled using the adaptive filter with an addition signal, as an error, obtained by adding the output of the first microphone to the output of the second microphone.

DETAILED DESCRIPTION

The following is a description of an embodiment of the present disclosure, taking as an example its application to a system in which users in a left front seat and a right front seat of a car listen to music using left and right loudspeakers provided at the seats, respectively.

Figure 1:
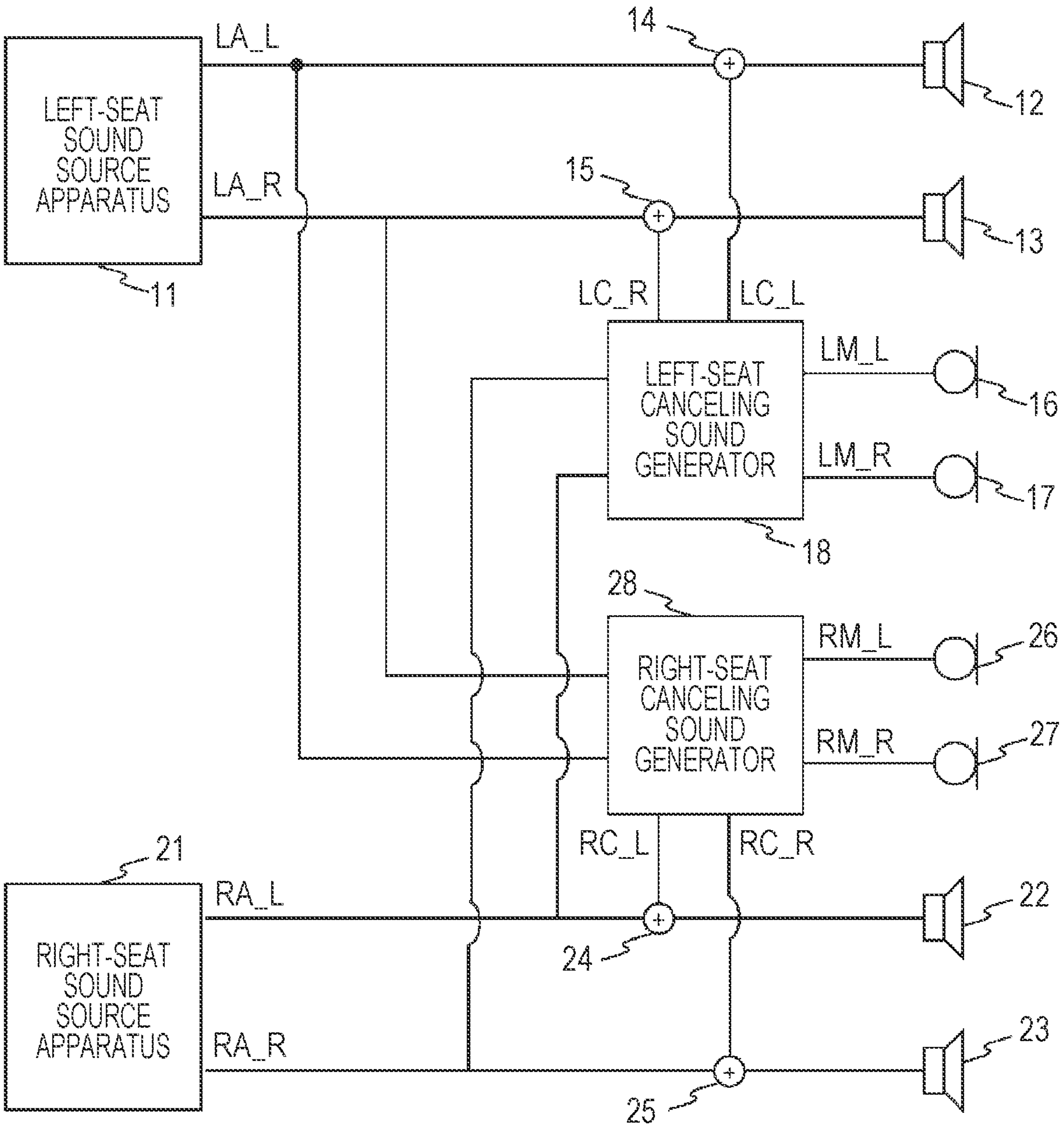
FIG. 1 is a block diagram illustrating a configuration of an in-vehicle system.

FIG. 1 is a diagram illustrating a configuration of an in-vehicle system.

As shown in the figure, the in-vehicle system includes a left-seat sound source apparatus 11 which is a sound source apparatus for a user in a left front seat in a cabin, a left-seat left speaker 12 which is a left channel speaker for the user in the left front seat, a left-seat right speaker 13 which is a right channel speaker for the user in the left front seat, a left-seat left channel adder 14, a left-seat right channel adder 15, a left-seat eft microphone 16, a left-seat right microphone 17, and a left-seat canceling sound generator 18.

The in-vehicle system further includes a right-seat sound source apparatus 21 for a user in a right front seat in the cabin, a right-seat left speaker 22 which is a left channel speaker for the user in the right front seat, a right-seat right speaker 23 which is a right channel speaker for the user in the right front seat, a right-seat left channel adder 24, a tight-seat tight channel adder 25, a right-seat left microphone 26, a right-seat right microphone 27, and a right-seat canceling sound generator 28.

Figure 2A:
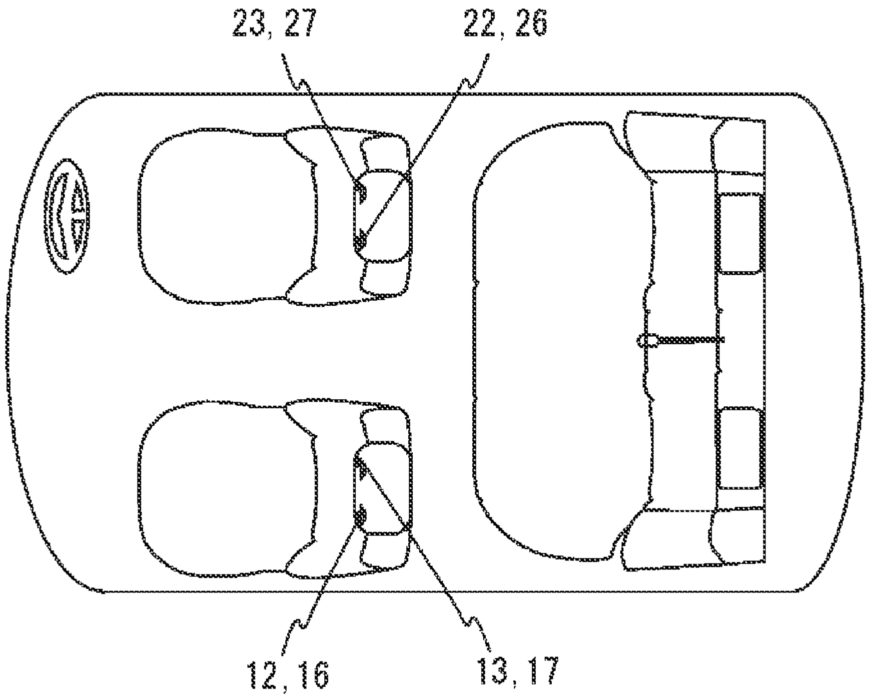
FIGS. 2A and 2B are diagrams illustrating arrangement of microphones and speakers.
Figure 2B:
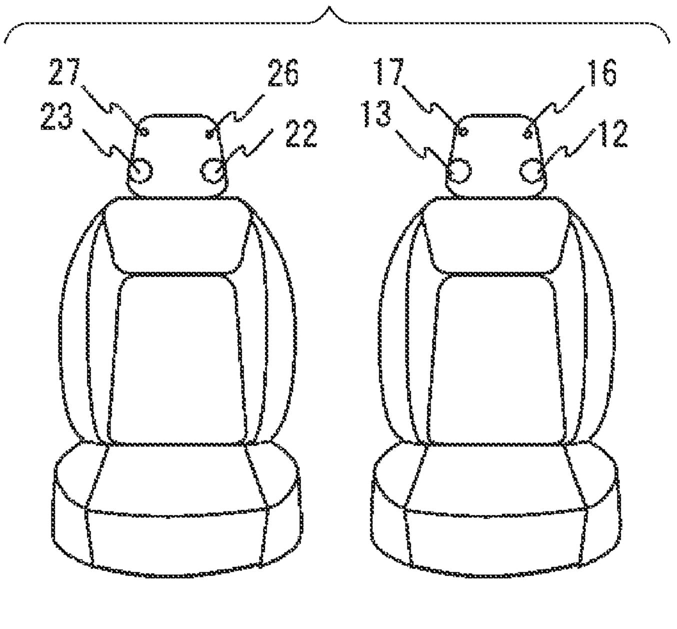

As shown in FIGS. 2A and 2B, the left-seat left speaker 12 is located on a left side of a head of the user seated in the left front seat, and the left-seat right speaker 13 is located on a right side of the head of the user seated in the left front seat. The left-seat left microphone 16 is positioned on the left side of the head of the user seated in the left front seat, and the left-seat right microphone 17 is positioned on the right side of the head of the user seated in the left front seat.

The right-seat left speaker 22 is positioned on a left side of a head of the user seated in the right front seat, and the right-seat right speaker 23 is located on a right side of the head of the user seated in the right front seat. The right-seat left microphone 26 is positioned on the left side of the head of the user seated in the right front seat, and the right-seat right microphone 27 is positioned on the right side of the head of the user seated in the right front seat.

Returning to FIG. 1, the left-seat sound source apparatus 11 outputs a left channel audio LA_L and a right channel audio LA_R, such as music. The left channel audio LA_L is added, by the left-seat left channel adder 14, to a left-seat left channel canceling sound LC_L output from the left-seat canceling sound generator 18 and is output to the left-seat left speaker 12. The right channel audio LA_R is added, by the left-seat right channel adder 15, to a left-seat right channel canceling sound LC_R output from the left-seat canceling sound generator 18 and is output to the left-seat right speaker 13.

The right-seat sound source apparatus 21 outputs a left channel audio RA_L and a right channel audio RA_R, such as music. The left channel audio RA_L is added, by the right-seat left channel adder 24, to a right-seat left channel canceling sound RC_L output from the right-seat canceling sound generator 28 and is output to the right-seat left speaker 22. The right channel audio RA_R is added, by the right-seat right channel adder 25, to a right-seat right channel canceling sound RC_R output from the right-seat canceling sound generator 28 and is output to the right-seat right speaker 23.

Then, the left-seat canceling sound generator 18 determines the left channel audio RA_L and the right channel audio RA_R of the right-seat sound source apparatus 21 output from the right-seat left speaker 22 and the right-seat right speaker 23 as noise and generates a left-seat left channel canceling sound LC_L and a left-seat right channel canceling sound. LC_R that cancel the noise transmitted from right using an output LM_L of the left-seat left microphone 16 and an output LM_R of the left-seat right microphone 17 as errors.

Furthermore, the right-seat canceling sound generator 28 determines the left channel audio LA_L and the right channel audio LA_R of the left-seat sound source apparatus 11 output from the left-seat left speaker 12 and the left-seat right speaker 13 as noise and generates a right-seat left channel canceling sound RC_L and a right-seat right channel canceling sound RC_R that cancel the noise transmitted from left using an output RM_L of the right-seat left microphone 26 and an output RM_R of the right-seat right microphone 27 as errors.

The left-seat canceling sound generator 18 will be described below.

Figure 3:
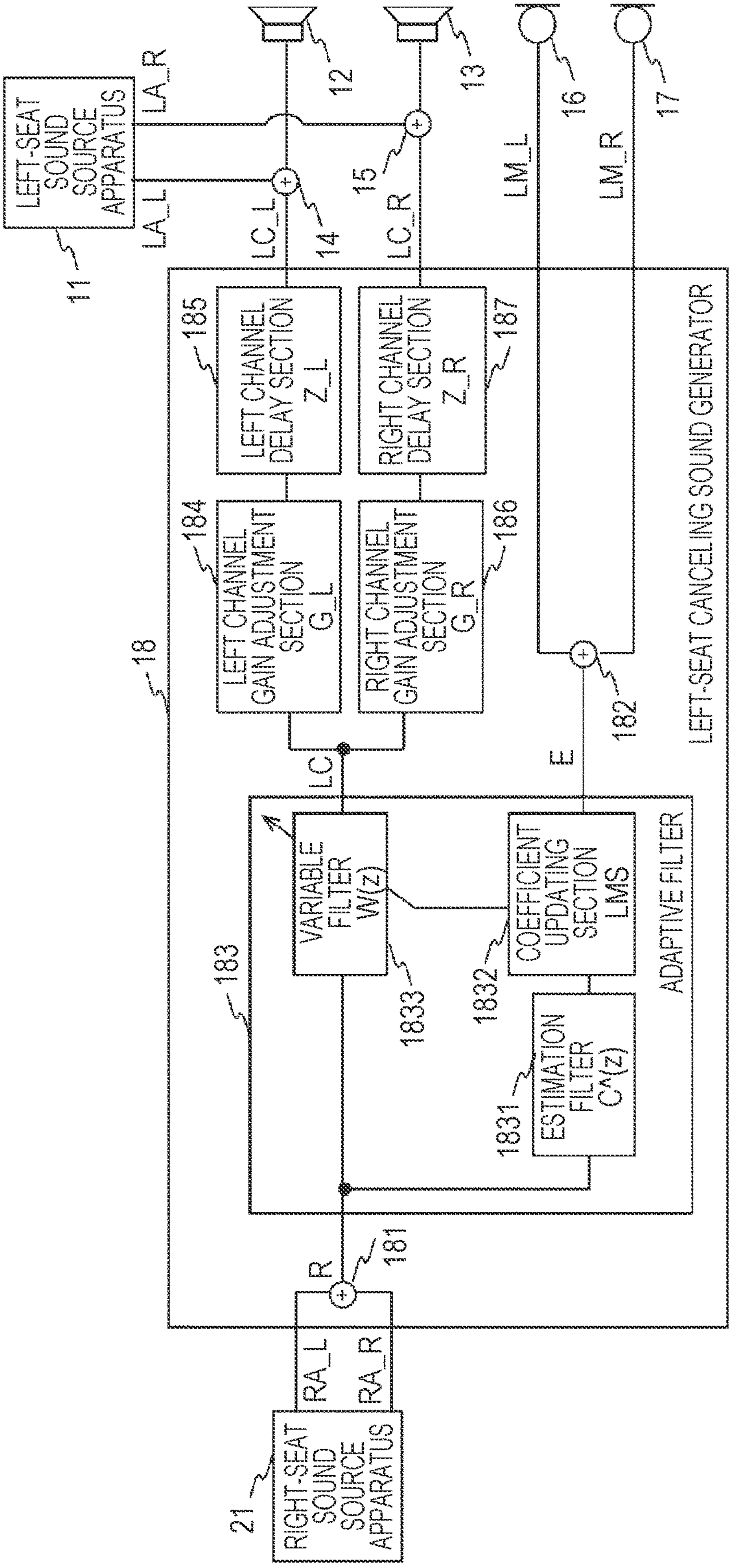
FIG. 3 is a block diagram illustrating a configuration of a left-seat canceling sound generator.

FIG. 3 is a diagram illustrating a configuration of the left-seat canceling sound generator 18.

As shown in FIG. 3, the left-seat canceling sound generator 18 includes a reference signal adder 181 that generates a reference signal R by adding the left channel audio RA_L and the right channel audio RA_R of the right-seat sound source apparatus 21; an error adder 182 that generates an error signal E by adding the output LM_L of the left-seat left microphone 16 and the output LM_R of the left-seat right microphone 17; an adaptive filter 183 that generates a noise canceling sound LC using the reference signal R by performing an adaptive operation using the reference signal R and the error signal E; a left channel gain adjustment section 184; a left channel delay section 185; a right channel gain adjustment section 186; and a right channel delay section 187.

The adaptive filter 183 includes an estimation filter 1831 in which a transfer function $C\hat{}(z)$ estimated as a transfer function $C(z)$ from an output of the adaptive filter 183 to an output of the error adder 182, a coefficient updating section 1832, and a variable filter 1833.

The reference signal R output from the reference signal adder 181 serves as an input of the estimation filter 1831 and the variable filter 1833, and the coefficient updating section 1832 updates a tap coefficient of the variable filter 1833 such that power of the error signal E output from the error adder 182 is minimized by the Filtered-X LMS algorithm that performs the LMS algorithm using an output of the estimation filter 1831 as a filtered reference signal to update a transfer function W(z) of the variable filter 1833.

An output of the variable filter 1833 is then output from the adaptive filter 183 as noise canceling sound LC.

The noise canceling sound LC output from the variable filter 1833 is adjusted in a loudness level by a preset gain G_L in the left channel gain adjustment section 184, delayed by a preset delay time Z_L in the left channel delay section 185, and thereafter, output as a left-seat left channel canceling sound LC_L to the left-seat left speaker 12 via the left-seat left channel adder 14.

The noise canceling sound LC output from the variable filter 1833 is adjusted in a loudness level by a preset gain G_R in the right channel gain adjustment section 186, delayed by a preset delay time Z_R in the right channel delay section 187, and thereafter, output as a left-seat right channel canceling sound LC_R to the left-seat right speaker 13 via the left-seat right channel adder 15.

Here, the gain G_L of the left channel gain adjustment section 184 and the gain G_R of the right channel gain adjustment section 186 are set such that a ratio G_L/G_R between the gains matches a ratio M_L/M_R between a loudness level M_L of the noise transmitted from the noise source to the output LM_L of the left-seat left microphone 16 and a loudness level M_R of the noise transmitted from the noise source to the output LM_R of the left-seat right microphone 17.

The delay time Z_L of the left channel delay section 185 and the delay time Z_R of the right channel delay section 187 are set such that a difference Z_L−Z_R in delay time matches a difference d_L−d_R between a delay time d_L of the noise from the noise source to the output LM_L of the left-seat left microphone 16 and a delay time d_R of the noise from the noise source to the output LM_R of the left-seat right microphone 17.

Here, since the noise sources of noise to be canceled by the left-seat canceling sound generator 18 are the right-seat left speaker 22 and the right-seat right speaker 23, the gain G_L of the left channel gain adjustment section 184, the gain G_R of the right channel gain adjustment section 186, the delay time Z_L of the left channel delay section 185, and the delay time Z_R of the right channel delay section 187 may be set in advance, for example, as follows.

Specifically, a test sound is output from both the right-seat left speaker 22 and the right-seat right speaker 23 or from a measurement speaker installed in a center position between the right-seat left speaker 22 and the right-seat right speaker 23.

A loudness level M_L of the output test sound transmitted to the output LM_L of the left-seat left microphone 16 and a loudness level M_R of the output test sound transmitted of the output LM_R of the left-seat right microphone 17 are then determined, and the gain G_L of the left channel gain adjustment section 184 and the gain G_R of the right channel gain adjustment section 186 are set such that the obtained ratio M_L/M_R matches the ratio G_L/G_R.

Furthermore, a difference d_L−d_R between a delay time to the output LM_L of the left-seat left microphone 16 and a delay time to the output LM_R of the left-seat right microphone 17 is obtained and the delay time Z_L of the left channel delay section 185 and the delay time Z_R of the right channel delay section 187 are set such that the difference matches the obtained difference d_L−d_R.

Figure 4:
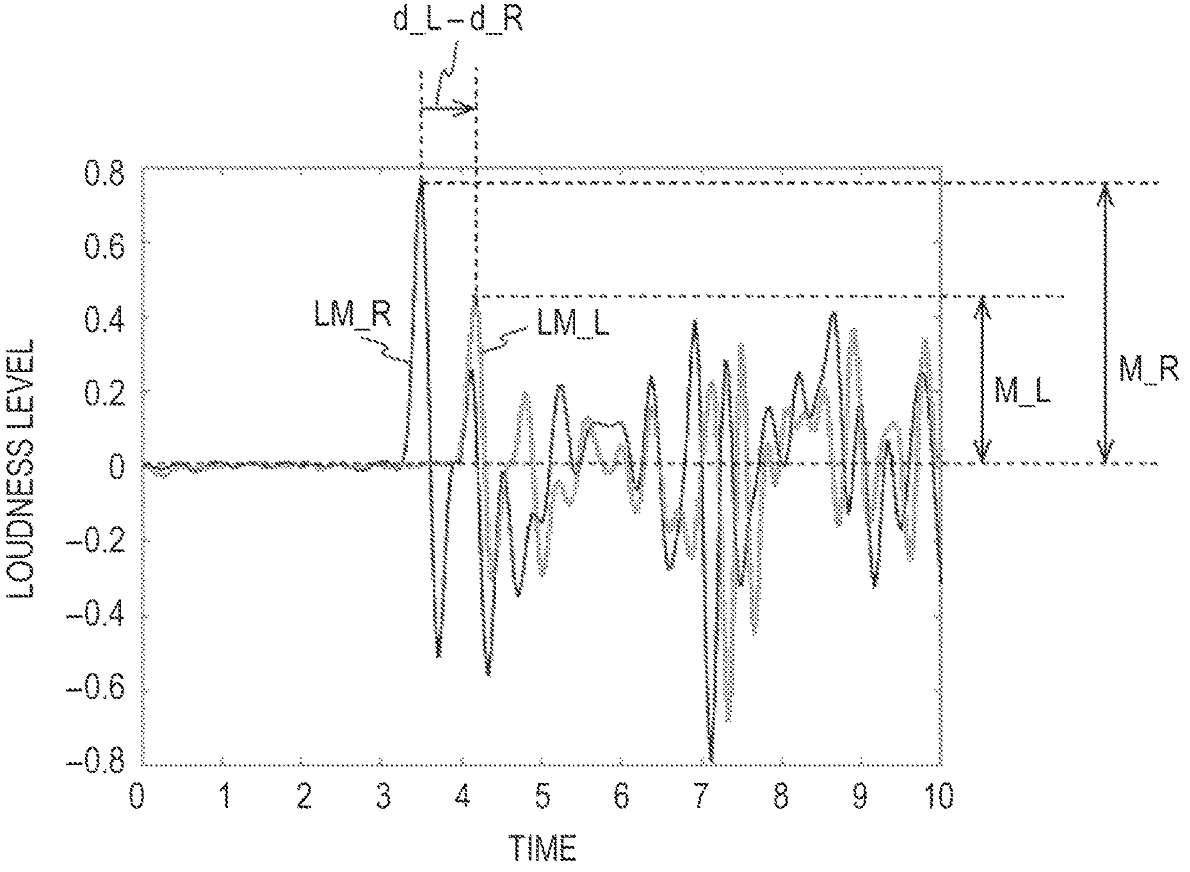
FIG. 4 is a graph for explaining a method for setting a gain and a delay time.
Figure 5:
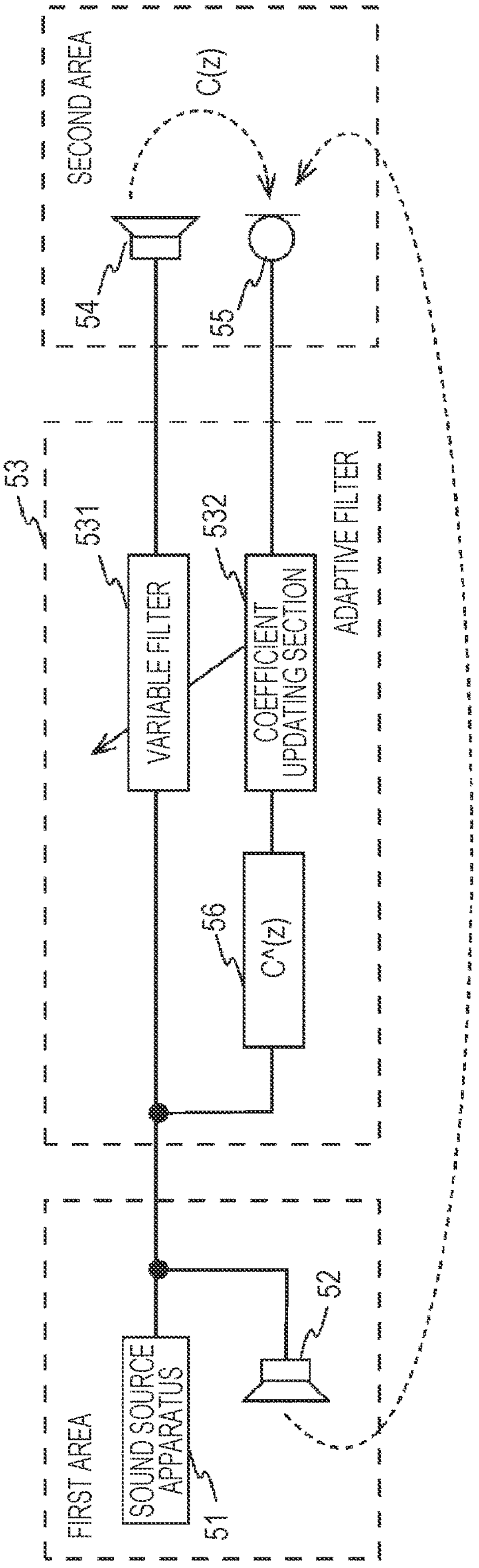
FIG. 5 is a diagram illustrating a configuration of a general active noise control system.

More specifically, for example, when waveforms of the output LM_L of the left-seat left microphone 16 and the output LM_R of the left-seat right microphone 17 obtained for the output test sound are those shown in FIG. 4, assuming that a loudness level of a peak that first appears in the output LM_L of the left-seat left microphone 16 is M_L and a loudness level of a peak that first appears in the output LM_R of the right-seat left microphone 26 is M_R, the gain G_L of the left channel gain adjustment section 184 and the gain G_R of the right channel gain adjustment section 186 are set such that the ratio G_L/G_R matches the ratio M_L/M_R.

Furthermore, a delay of the peak that first appears in the output LM_R of the right-seat left microphone 26 with respect to the peak that first appears in the output LM_L of the left-seat left microphone 16 is determined as d_L−d_R, and the delay time Z_L of the left channel delay section 185 and the delay time Z_R of the right channel delay section 187 are set such that the difference d_L−d_R matches the difference Z_L−Z_R.

Here, when d_L−d_R is positive, Z_L=d_L−d_R and Z_R=0 may be satisfied. Furthermore, in this case, the right channel delay section 187 may be omitted. Moreover, when d_L−d_R is negative, Z_L=0 and Z_R=−(d_L−d_R) may be satisfied. Furthermore, in this case, the left channel delay section 185 may be omitted The left-seat canceling sound generator 18 has been described above.

According to the left-seat canceling sound generator 18 described above, since the relationship between gains or delay times that matches the relationship between gains or delay times of noise from the noise source to the output LM_L of the left-seat left microphone 16 and the output LM_R. of the left-seat right microphone 17 may be assigned between the left-seat left channel canceling sound LC_L output from the left-seat left speaker 12 and the left-seat right channel canceling sound LC_R output from the left-seat right speaker 13, even when a gain of the noise or a difference between delay times is comparatively large, the noise may be appropriately canceled using the adaptive filter 183 with an addition signal, as an error, obtained by adding the output LM_L of the left-seat left microphone 16 to the output LM_R of the left-seat right microphone 17.

Next, the right-seat canceling sound generator 28 has a configuration in which the left seat and the right seat are replaced with each other in the above description of the left-seat canceling sound generator 18.

In the above, application to a system in which users in a left front seat and a right front seat of a car listen to music using left and right loudspeakers provided for those seats, respectively, is described, but this embodiment can be applied in the same way to seat combinations other than the combination of the left front seat and the right front seat. In this case, it is not necessarily the case that the seats are installed in a car.

One of skill in the art will appreciate that the various sections described above may, in some implementations, be implemented through circuitry and/or software stored in a memory and executed on a CPU such as a processor.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that, the disclosure will include all embodiments falling within the scope of the appended claims.

The invention claimed is:

1. An active noise control system that reduces noise, the active noise control system comprising:

a first microphone that is disposed in a position displaced in a first direction relative to a user;

a second microphone that is disposed in a position displaced in a second direction relative to the user;

a first speaker configured to emit sound toward an area around the position where the first microphone is disposed;

a second speaker configured to emit sound toward an area around the position where the second microphone is disposed;

an error signal generator configured to generate an addition signal by adding an output of the first microphone and an output of the second microphone;

an adaptive filter configured to perform an adaptive operation of minimizing an error using a signal correlated with the noise as a reference signal and the addition signal as the error so as to generate a noise canceling sound to be output from the first and second speakers; and a gain adjustment section configured to adjust a ratio between a loudness level of a first noise canceling sound which is the noise canceling sound to be output from the first speaker and a loudness level of a second noise canceling sound which is the noise canceling sound to be output from the second speaker;

wherein the gain adjustment section is configured to perform the adjustment so that the ratio of the loudness level of the second noise canceling sound to the loudness level of the first noise canceling sound matches a ratio of a loudness level of noise transmitted from a noise source of the noise to the second microphone to a loudness level of noise transmitted from the noise source of the noise to the first microphone.

2. The active noise control system according to claim 1, wherein:

when one of a position near a left ear of the user or a position near a right ear of the user is determined as a first position and the other is determined as a second position, the first microphone is disposed in the first position and the second microphone is disposed in the second position.

3. The active noise control system according to claim 2, wherein:

when one of left or right seats of a car is determined as a first seat and the other is determined as a second seat, the user seats on the first seat, and the noise is sound output from a loudspeaker near the second seat to an occupant of the second seat.

4. An active noise control system that reduces noise, the active noise control system comprising:

a first microphone that is disposed in a position displaced in a first direction relative to a user;

a second microphone that is disposed in a position displaced in a second direction relative to the user;

a first speaker configured to emit sound toward an area around the position where the first microphone is disposed;

a second speaker configured to emit sound toward an area around the position where the second microphone is disposed;

an error signal generator configured to generate an addition signal by adding an output of the first microphone and an output of the second microphone;

an adaptive filter configured to perform an adaptive operation of minimizing an error using a signal correlated with the noise as a reference signal and the addition signal as the error so as to generate a noise canceling sound to be output from the first and second speakers; and a delay adjustment section configured to adjust a delay time between a first noise canceling sound which is the noise canceling sound output from the first speaker and a second noise canceling sound which is the noise canceling sound output from the second speaker;

wherein the delay adjustment section is configured to perform the adjustment such that a delay time of the second noise canceling sound relative to the first noise canceling sound matches a delay time of noise transmitted from a noise source of noise to the second microphone relative to the noise transmitted from the noise source of the noise to the first microphone.

5. The active noise control system according to claim 4, further comprising:

a gain adjustment section configured to adjust a ratio between a loudness level of a first noise canceling sound which is the noise canceling sound to be output from the first speaker and a loudness level of a second noise canceling sound which is the noise canceling sound to be output from the second speaker;

wherein the gain adjustment section is configured to perform the adjustment such that the ratio of the loudness level of the second noise canceling sound to the loudness level of the first noise canceling sound matches a ratio of a loudness level of noise transmitted from a noise source of the noise to the second microphone to a loudness level of noise transmitted from the noise source of the noise to the first microphone.

6. The active noise control system according to claim 5, wherein:

when one of a position near a left ear of the user or a position near a right ear of the user is determined as a first position and the other is determined as a second position, the first microphone is disposed in the first position and the second microphone is disposed in the second position.

7. The active noise control system according to claim 6, wherein:

when one of left or right seats of a car is determined as a first seat and the other is determined as a second seat, the user seats on the first seat, and the noise is sound output from a loudspeaker near the second seat to an occupant of the second seat.

8. The active noise control system according to claim 4, wherein:

when one of a position near a left ear of the user or a position near a right ear of the user is determined as a first position and the other is determined as a second position, the first microphone is disposed in the first position and the second microphone is disposed in the second position.

* * * * *